United States Patent
Ikeda et al.

(10) Patent No.: US 11,768,730 B2
(45) Date of Patent: Sep. 26, 2023

(54) ANALYZING DEVICE, ANALYZING METHOD, AND ANALYZING PROGRAM

(71) Applicant: NIPPON TELEGRAPH AND TELEPHONE CORPORATION, Tokyo (JP)

(72) Inventors: Miho Ikeda, Tokyo (JP); Hiroyuki Uekawa, Tokyo (JP); Satoshi Takahashi, Tokyo (JP); Koji Kishi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/601,033

(22) PCT Filed: Mar. 18, 2020

(86) PCT No.: PCT/JP2020/011906
§ 371 (c)(1),
(2) Date: Oct. 1, 2021

(87) PCT Pub. No.: WO2020/203282
PCT Pub. Date: Oct. 8, 2020

(65) Prior Publication Data
US 2022/0156136 A1    May 19, 2022

(30) Foreign Application Priority Data
Apr. 3, 2019  (JP) ................................ 2019-071624

(51) Int. Cl.
*G06F 11/07* (2006.01)
(52) U.S. Cl.
CPC ........ *G06F 11/079* (2013.01); *G06F 11/0721* (2013.01)

(58) Field of Classification Search
CPC ........................... G06F 11/079; G06F 11/0721
See application file for complete search history.

(56) References Cited

U.S. PATENT DOCUMENTS

| | | | | |
|---|---|---|---|---|
| 9,690,644 | B2 * | 6/2017 | Anderson | ........... G06F 11/0793 |
| 9,710,122 | B1 * | 7/2017 | Pillay | ...................... H04L 41/12 |
| 2021/0352136 | A1 * | 11/2021 | Dojka | ................. H04L 63/1433 |

OTHER PUBLICATIONS

Cabinet Office, Government of Japan (2013) "Business Continuity Guidelines-Strategy and Response to Overcome All Crisis Events" literature [online] website: http://www.bousai.go.jp/kyoiku/kigyou/pdf/guideline03.pdf.

* cited by examiner

*Primary Examiner* — Nadeem Iqbal

(57) ABSTRACT

A storage unit (14) stores a service procedure constituting business, a service support system used in the service procedure, and a service function constituting the service support system in association with each other, and stores a status determination checklist in which a plurality of conditions for determining whether the service procedure, the service support system, and the service function are normal are represented by a logical combination. A service function determination section (15d) determines whether a service function corresponding to the service support system is functioning normally, by using failure information of a service support system and the status determination checklist. When it is determined that the service function is not functioning normally, a service activity determination section (15e) determines whether a service procedure corresponding to the service function is normally executed, by using the status determination checklist.

18 Claims, 13 Drawing Sheets

| | DETERMINATION ITEM | AND/OR | DETAILED DETERMINATION ITEM | AND/OR |
|---|---|---|---|---|
| 1-1 | OS IS RUNNING | AND | CURRENT IS APPLIED (POWER FAILURE HAS NOT OCCURRED) | AND |
| | | | POWER CABLE IS NORMAL | AND |
| | | | HARDWARE IS NORMAL (HARDWARE HAS NOT FAILED) | AND |
| 1-2 | MIDDLEWARE IS RUNNING | AND | ⋮ | ⋮ |
| 1-3 | APPLICATION IS RUNNING | AND | ⋮ | ⋮ |
| 1-4 | CAN ACCESS INTERNET | AND | ⋮ | ⋮ |

ANALYZING DEVICE, ANALYZING METHOD, AND ANALYZING PROGRAM

CROSS-REFERENCE TO RELATED APPLICATIONS

This application is a U.S. 371 Application of International Patent Application No. PCT/JP2020/011906, filed on 18 Mar. 2020, which application claims priority to and the benefit of JP Application No. 2019-071624, filed on 3 Apr. 2019, the disclosures of which are hereby incorporated herein by reference in their entireties.

TECHNICAL FIELD

The present invention relates to an analysis device, an analysis method, and an analysis program.

BACKGROUND ART

Organizations such as companies and government offices use one or more IT systems to improve service efficiency. When an incident of an IT system failure occurs due to program bugs, device malfunction, or cyberattacks, the service using such an IT system is forced to be delayed or stopped, which affects the entire business. In preparation for such a situation, a formulation of a business continuity plan is recommended to analyze and evaluate effects of an incident and prepare preventive measures of the incident and countermeasures at the time of incident occurrence in advance (see Non-Patent Literature 1).

Conventionally, the formulation of a business continuity plan has been performed by a procedure of formulating a basic policy, analyzing and evaluating the degree of business effect and risk, and examining a business continuity strategy and countermeasures. The analysis of the degree of business effect is performed by a procedure of evaluating the degree of effect due to business interruption, narrowing down an important service that should be continued and restored preferentially based on the result, setting a target restoration time and a target restoration level, and grasping important elements that are indispensable for the implementation of each important service to extracting a bottleneck.

In addition, the analysis of risk is performed by a procedure of finding out occurrence events that may cause business interruption, evaluating the possibility of occurrence of these events and the degree of effect when the events occur, narrowing down the occurrence events that should be handled preferentially, examining damage of the important service, which is narrowed down by the analysis of the degree of business effect, caused by the occurrence events, and estimating a target restoration time and a target restoration level.

In order to effectively formulate countermeasures at the time of incident occurrence according to these procedures, it is necessary to accurately grasp the situation of damage caused by the incident and appropriately select countermeasures for the damage situation when the incident occurrence occurs.

CITATION LIST

Non-Patent Literature

Non-Patent Literature 1: "Business Continuity Guidelines-Strategy and Countermeasures to Overcome Any Crisis Event-", [online], August, 2013, Minister of State for Disaster Management, [Search on Mar. 11, 2019], Internet site <URL: http://www.bousai.go.jp/kyoiku/kigyou/pdf/guideline03.pdf>

SUMMARY OF THE INVENTION

Technical Problem

However, according to the conventional technique, it may in some cases be difficult to accurately grasp the situation of damage caused by an incident and appropriately select countermeasures at the time of incident occurrence. For example, a service abnormality of a rapid increase in inquiry service due to product recall is not caused by a failure of the IT system. In such a case, when the countermeasures are examined on the assumption that an abnormality has occurred in the IT system, only an erroneous countermeasure inappropriate for the original purpose is selected. In other words, regarding the service using the IT system, the causal relationship from "the failure occurs in the IT system" to "the service can be disturbed" is correct, but the causal relationship from "the service can be disturbed" to "the failure occurs in the IT system" is not correct.

As described above, even when the failure does not occur in the IT system, an abnormality can occur in the service. In addition, even when the failure occurs in the IT system, it does not necessarily mean that the service is disturbed by redundancy and load distribution.

Therefore, in order to accurately grasp the situation of damage caused by an incident, very advanced information processing is required in which the causal relationship between the incident and the damage can be accurately derived from various types, contents, and granularity of information that occur in large quantities in various places. In order for a person to carry out such information processing, knowledge, experience, and enormous amounts of time are required. In addition, the person may be biased by his or her desired causal relationship, leading to omission of any causal relationship that should be present or erroneous evaluation on the magnitude of the causal relationship.

An object of the present invention, which has been made in view of the above circumstances, is to accurately grasp the situation of damage caused by an incident and to appropriately select a countermeasure at the time of incident occurrence.

Means for Solving the Problem

In order to solve the above problems and achieve the object, an analysis device according to the present invention includes: a storage unit that stores a service procedure constituting business, a service support system used in the service procedure, and a service function constituting the service support system in association with each other, and stores a status determination checklist in which a plurality of conditions for determining whether the service procedure, the service support system, and the service function are normal are represented by a logical combination; a service function determination section that determines whether a service function corresponding to the service support system is functioning normally, by using failure information of a service support system and the status determination checklist; and a service activity determination section that, when it is determined that the service function is not functioning normally, determines whether a service procedure corresponding to the service function is normally executed, by using the status determination checklist.

Effects of the Invention

According to the present invention, it is possible to accurately grasp a situation of damage caused by an incident and to appropriately select a countermeasure at the time of incident occurrence.

BRIEF DESCRIPTION OF DRAWINGS

FIG. 5 is a diagram illustrating a status determination checklist.

DESCRIPTION OF EMBODIMENTS

Figure 1:
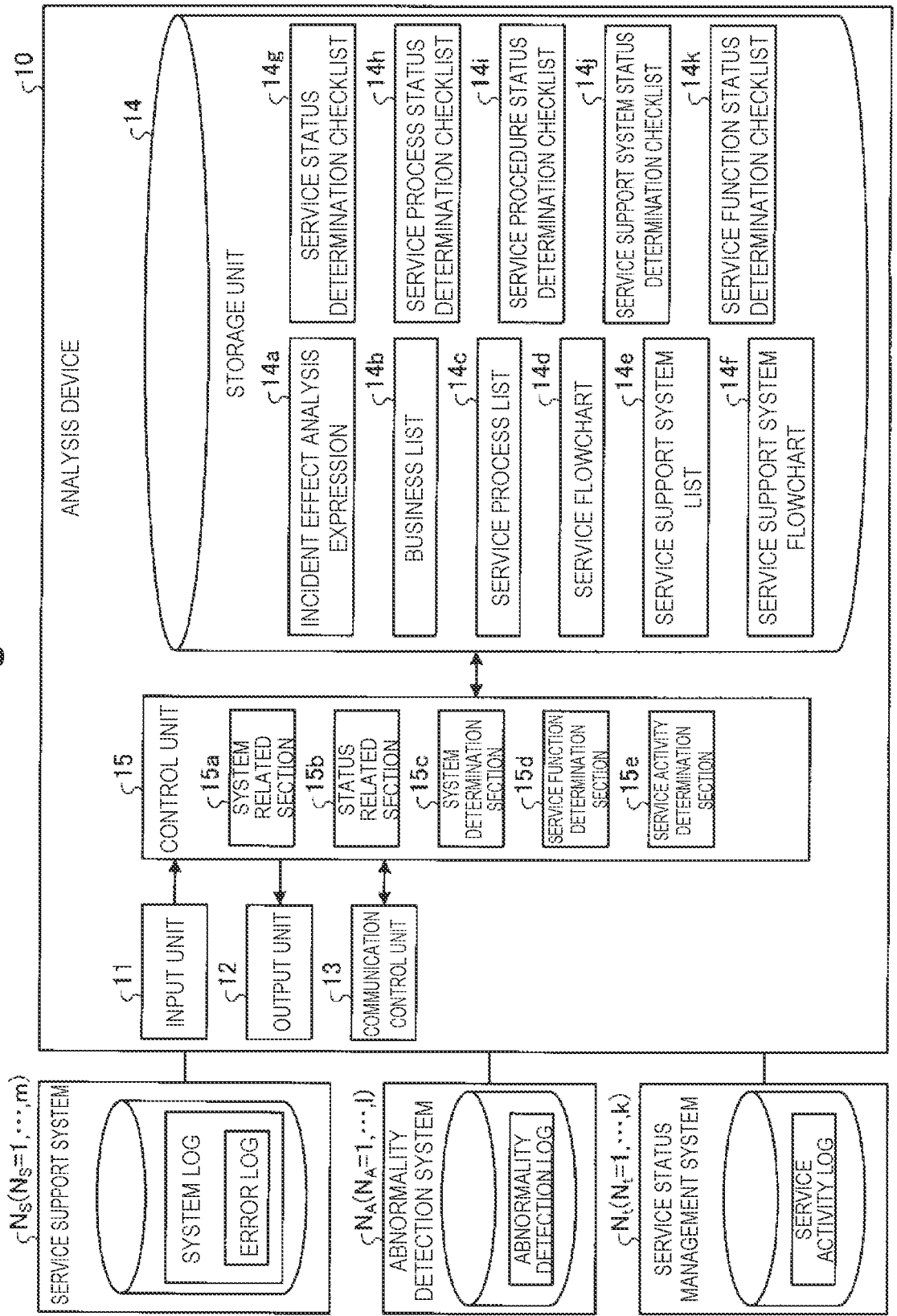
FIG. 1 is a schematic diagram illustrating a schematic configuration of a system including an analysis device of an embodiment.

Embodiments of the present invention will be described below in detail with reference to the drawings. The present invention is not limited to the embodiments. In the description of the drawings, the same components are denoted by the same reference numerals.

First Embodiment

[Configuration of System]

FIG. 1 is a schematic diagram illustrating a schematic configuration of a system including an analysis device of the present embodiment. As illustrated in FIG. 1, an analysis device 10 of the present embodiment performs analysis processing to be described below using information of a plurality of service support systems $N_S$ ($N_S$=1, . . . , m), a plurality of abnormality detection systems $N_A$ ($N_A$=1, . . . , l), and a plurality of service situation management systems $N_t$ ($N_t$=1, . . . , k). Here, m, l, and k may be different numerical values.

The service support system $N_S$ is an IT system used to carry out service in an organization that performs business. Each of the service support system $N_S$ stores a system log and an error log. The system log indicates an operation history of the service support system $N_S$. The system log includes an error log. The error log includes failure information indicating which of service functions of the service support system $N_S$ is in an abnormal status when an abnormality occurs. In analysis processing to be described below, a system log including failure information may be used instead of the error log.

The abnormality detection system $N_A$ is a system used to detect abnormalities in the service support system $N_S$. One or more abnormality detection systems $N_A$ are present corresponding to one or more service support systems $N_S$. Each of the abnormality detection systems $N_A$ stores an abnormality detection log, which is a history when an abnormality is detected in each target service support system $N_S$. The abnormality detection log includes failure information indicating which of service functions of the target service support system $N_S$ is in an abnormal status. In the analysis processing to be described below, the analysis device 10 determines normality of the service support system $N_S$ using the failure information.

The service situation management system $N_t$ is a system used to manage a situation of a service activity in the organization that performs the business. Each of the service situation management systems $N_t$ stores a service activity log. The service activity log describes execution results of various tasks of each organization and each person in charge, for example, service processes that make up respective types of business, plans and results of the service procedure, and sales in each business. In the analysis processing to be described below, the analysis device 10 uses a service activity log to confirm the schedule of the service activity and to analyze the tendency of an execution frequency of the service activity.

[Configuration of Analysis Device]

As illustrated in FIG. 1, the analysis device 10 is realized by a general-purpose computer such as a personal computer, and includes an input unit 11, an output unit 12, a communication control unit 13, a storage unit 14, and a control unit 15.

The input unit 11 is realized using an input device such as a keyboard or a mouse, and input various types of instruction information such as a start of processing to the control unit 15 in response to an input operation from an operator. The output unit 12 is realized by a display device such as a liquid crystal display or a printing device such as a printer. For example, the output unit 12 display results of the analysis processing to be described below.

The communication control unit 13 is realized by an NIC (Network Interface Card), and controls communication between an external device and the control unit 15 via a telecommunication line such as a LAN (Local Area Network) or the Internet. For example, the communication control unit 13 controls communication between the control unit 15 and the service support system $N_S$, the abnormality detection system $N_A$, or the management device that manages various types of information on the business, the service, and the service support system N; used for the analysis processing to be described below.

The storage unit 14 is realized by a semiconductor memory element such as a RAM (Random Access Memory) or a flash memory or a storage device such as a hard disk or an optical disk. The storage unit 14 may be configured to communicate with the control unit 15 via the communication control unit 13.

In the present embodiment, the storage unit 14 stores a service procedure constituting business, a service support system used in the service procedure, and a service function constituting the service support system in association with each other, and stores a status determination checklist in which a plurality of conditions for determining whether the service procedure, the service support system, and the service function are normal are represented by logical combination.

Specifically, the storage unit 14 stores an incident effect analysis expression 14*a*, a business list 14*b*, a service process list 14*c*, a service flowchart 14*d*, a service support system list 14*e*, and a service support system flowchart 14*f*. Further, the storage unit 14 stores various status determination checklists, for example, a business status determination checklist 14*g*, a service process status determination checklist 14*h*, a service procedure status determination checklist 14*i*, a service support system status determination checklist 14*j*, and a service function status determination checklist 14*k*.

Prior to the analysis processing to be described below, these types of information are collected from the management device that manages various types of information related to the business, the service, and the service support system $N_S$ and are stored in the storage unit 14. The various types of information are not limited to the case of being stored in the storage unit 14 of the analysis device 10, and, for example, may be collected when the analysis processing to be described below is executed.

The incident effect analysis expression 14*a* includes predetermined relational expressions that defines a relation between various types of information used in the analysis processing to be described below. Each of the relational expressions defines functions to be applied and coefficients of the functions.

The business list 14*b* is a list of a target business in the analysis processing to be described below. In addition, the service process list 14*c* is information indicating an association between business and a service process constituting the business. Specifically, the service process list 14*c* is information indicating an association between respective types of business and service process groups constituting the respective types of business and an order relation of respective service processes constituting the respective service process groups.

The service flowchart 14*d* is information indicating an association between a service process and a service procedure constituting the service process. Specifically, the service flowchart 14*d* is information indicating an association between service processes and service procedure groups constituting the respective service processes and an order relation of respective service procedures constituting the respective service procedure groups.

Figure 2:
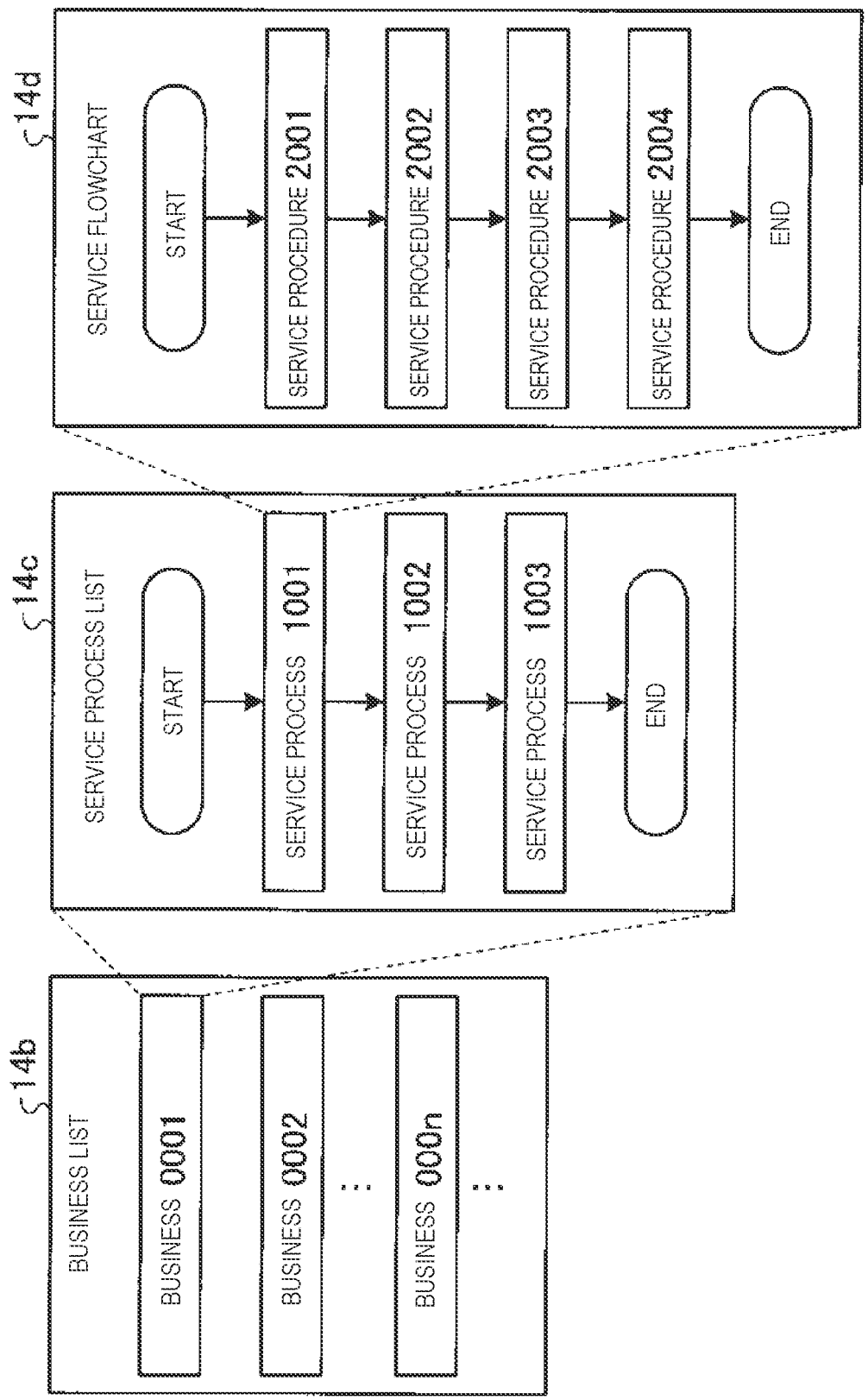
FIG. 2 is a diagram illustrating business related information.

Here, FIG. 2 is a diagram illustrating business related information. The business related information indicates the business list 14*b*, the service process list 14*c*, and the service flowchart 14*d* which are described above. As shown in FIG. 2, a system related section 15*a* to be described below of the control unit 15 can associate the business, the service process group, the service process, the service procedure group, and the service procedure with each other using the business related information.

Figure 3:
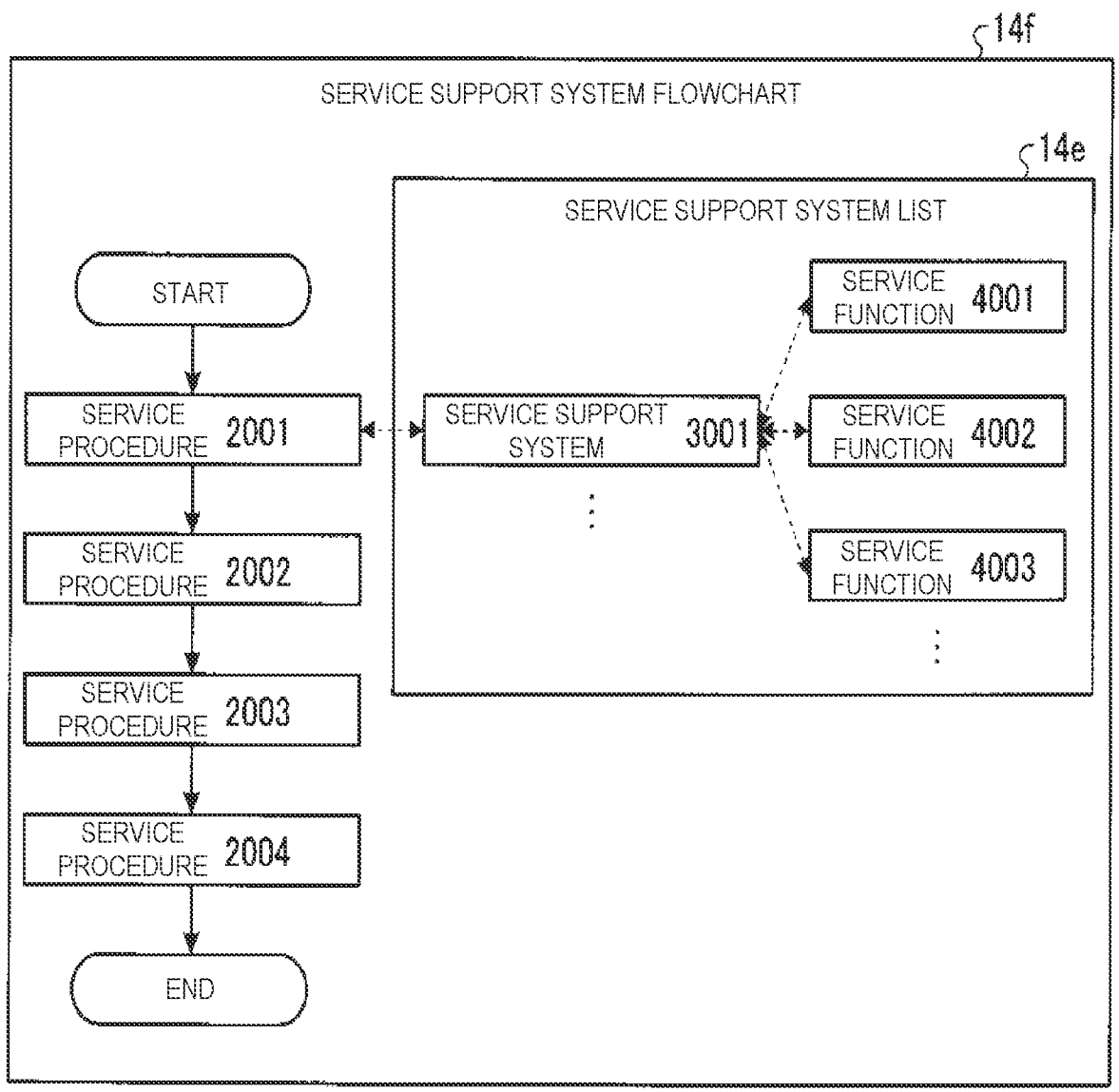
FIG. 3 is a diagram illustrating service support system related information.
Figure 4:
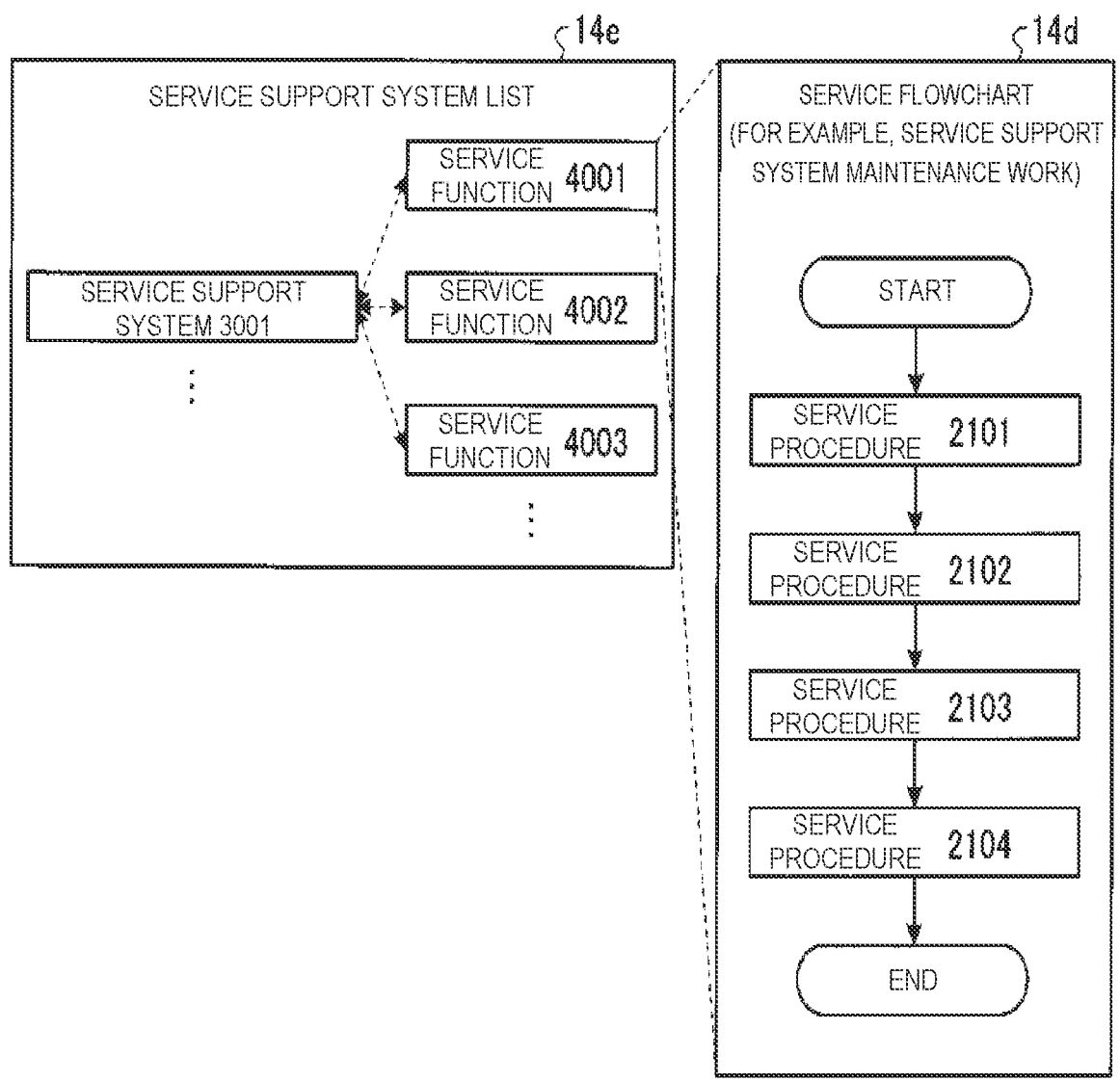
FIG. 4 is a diagram illustrating service support system related information.

FIGS. 3 and 4 are diagrams illustrating service support system related information. The service support system related information indicates the service support system list 14*e* and the service support system flowchart 14*f*.

The service support system list 14*e* is information indicating a service support system used in service. Specifically, the service support system list 14*e* is information indicating an association between service support systems used in respective service procedures and service functions provided by the respective service support system.

The service support system flowchart 14*f* is information indicating an association between the service procedure and the service support system used in the service procedure and an association between the service procedure and the service functions of the respective service support systems. Specifically, the service support system flowchart 14*f* is information indicating a list of an association between service procedures and service support systems used in the respective service procedures and an association between the service procedures and service functions of the respective service support systems. In other words, as shown in FIG. 3, the service support system flowchart 14*f* is information in which the respective service functions of the service flowchart 14*d* described above is associated with the service support system list 14*e*.

As shown in FIG. 4, the respective service functions may be associated with a service process and a service procedure group constituting the service process. In other words, in a case where a failure occurs in the respective service functions, a maintenance work for restoring the respective service functions may be associated.

Each of the business list 14*b*, the service process list 14*c*, the service flowchart 14*d*, the service support system list 14*e*, the service support system list 14*e*, the service support system flowchart 14*f* described above is defined with an element name or an element ID that can be uniquely identified. Thus, the system related section 15*a* can associate each of the business, the service process, the service procedure, the service support system, and the service function as shown in FIGS. 2 to 4.

Therefore, the system related section 15*a* can specify other list or flowchart element related to any list or flowchart elements across these list or flowcharts. For example, the system related section 15*a* can specify all types of business that use a certain service function. Similarly, the service process group constituting the respective types of business and the service procedure group constituting the respective service processes may be defined with element names or element IDs that can be uniquely identified.

Figure 6:
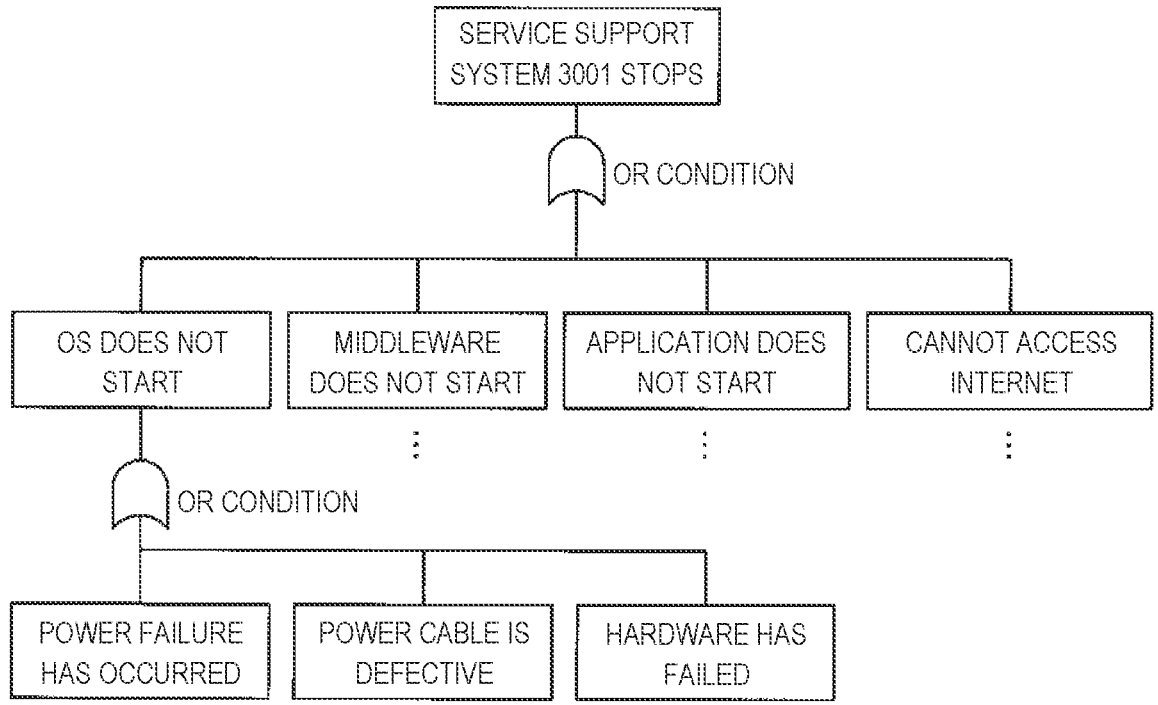
FIG. 6 is a diagram illustrating a status determination checklist.
Figure 7:
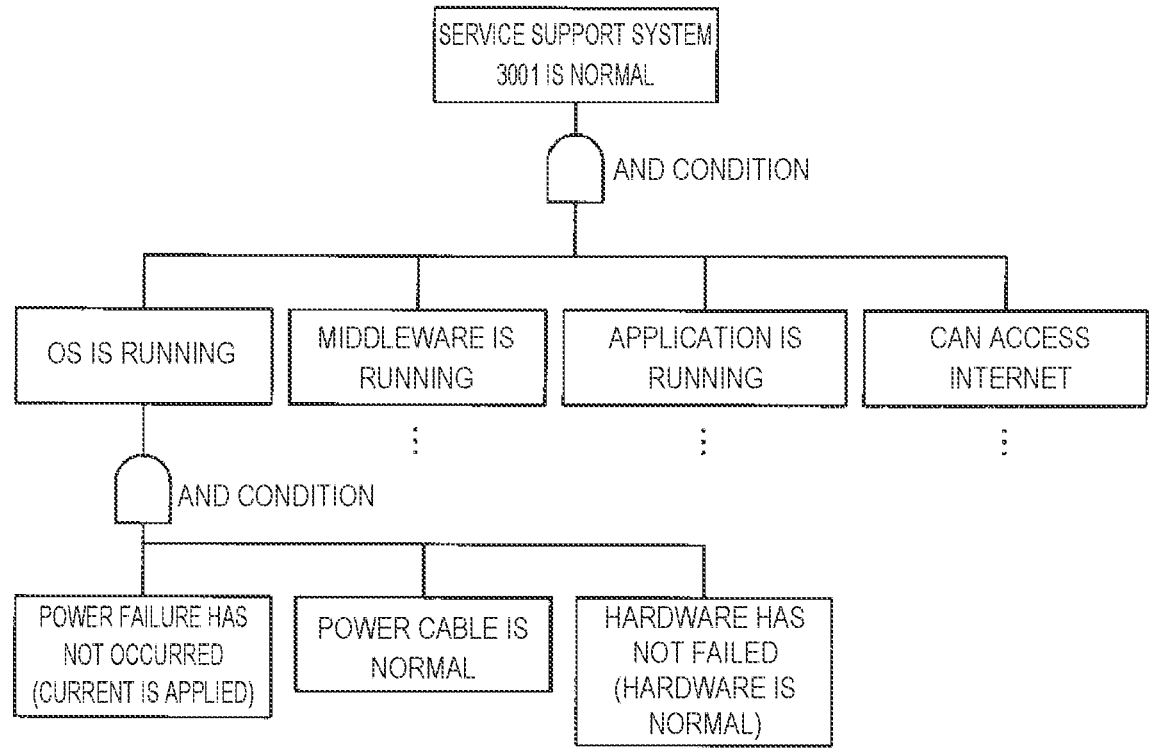
FIG. 7 is a diagram illustrating a status determination checklist.

In addition, FIGS. 5 to 7 are diagrams illustrating status determination checklists. The status determination checklists are a business status determination checklist 14*g*, a service process status determination checklist 14*h*, a service procedure status determination checklist 14*i*, a service support system status determination checklist 14*j*, and a service function status determination checklist 14*k*.

These status determination checklists indicate conditions for determining that the business, the service process, the service procedure, the service support system, and the service function are in a normal status, respectively. Here, the statuses where that the business, the service process, and the service procedure are normal mean that the business, the service process, and the service procedure are normally performed, respectively. Further, the statuses where the service support system and the service function are normal means that the service support system and the service function are normally functioning, respectively. Each of the status determination checklists is represented by a tree structure in which elements of determination criteria are combined by AND or OR.

For example, FIG. 5 illustrates a data configuration of the service support system status determination checklist 14*j*. An example shown in FIG. 5 is a status determination checklist for determining whether a "service support system 3001 is in a normal status", and shows elements of determination criteria as determination items or detailed determination items.

Further, FIGS. 6 and 7 illustrate a case where an FTA (Fault Tree Analysis) is applied to create the service support system status determination checklist 14*j*. First, an occurrence of a higher-level event "Service support system 3001 stops" shall be determined when any one event of lower-level events "OS is not running", "Middleware is not running", "Application is not running", and "Access to Internet is not possible" occurs. In this case, as shown in FIG. 6, an occurrence condition of the higher-level event is represented by an OR combination of the lower-level events.

An occurrence condition of the event "OS is not running" is represented by an OR combination of lower-level events "Power failure has occurred", "Power cable is defective", and "Hardware has failed".

In this way, a logical structure of the cause of the event "Service support system 3001 stops" can be represented by a tree structure. Further, as shown in FIG. 7, a checklist for determining whether the "service support system 3001 is in a normal status" can be represented by a tree structure by a reverse of the logical structure together with AND/OR. For example, a condition for determining the "OS is normally running" is represented by an AND condition of "Power failure has not occurred", "Power cable is normal", and "Hardware has not failed". Thus, the service support system status determination checklist 14*j* shown in FIG. 5 is created.

Each of the status determination checklists is not limited to two normal/abnormal values of each element of the determination criteria, and may be configured by adding a performance value of each element. For example, when the service support system 3001 normally operates, a maximum processing performance value per unit time of any service function may be added in addition to the determination that "the service support system 3001 is in a normal status".

Specifically, for example, it is assumed that a service function 4001 is realized by a load distribution configuration of the service support system 3001 and the service support system 3011. In this case, processing performance of the service function 4001 is usually the sum of processing performance of the service support system 3001 and processing performance of the service support system 3011. On the other hand, when a failure occurs in either of the service support system 3001 or the service support system 3011, the service function 4001 can be realized, but the processing performance is a value of either processing performance that is operating normally. In this case, a processing performance value at the time of normal/failure occurrence may be added to the service function status determination checklist.

Returning to FIG. 1, the description is given. The control unit 15 is realized using a CPU (Central Processing Unit) and executes a processing program stored in a memory. Thus, as illustrated in FIG. 1, the control unit 15 functions as a system related section 15*a*, a status related section 15*b*, a system determination section 15*c*, a service function determination section 15*d*, and a service activity determination section 15*e*. These functional sections may be mounted in different hardware, respectively or in part.

The system related section 15*a* refers to the storage unit 14 and associates the business with at least one of the service support system and the service function corresponding to the business. In other words, the system related section 15*a* associates elements of the business, the service process, the service procedure, the service support system, and the service function with each other as shown in FIGS. 2 to 4.

The present embodiment is not limited to a case where all of the service support system and the service function are associated with the business, and also includes a case where some of the service support system and the service function are associated with the business.

In addition, various types of information on the incident effect analysis expression 14*a*, the business list 14*b*, the service process list 14*c*, the service flowchart 14*d*, the service support system list 14*e*, the service support system flowchart 14*f*, the business status determination checklist 14*g*, the service process status determination checklist 14*h*, the service procedure status determination checklist 14*i*, the service support system status determination checklist 14*j*, and the service function status determination checklist 14*k* are not limited to a case of being stored in the storage unit 14. For example, the control unit 15 may include a collection section, which collects such types of information, prior to the processing of the system related section 15*a*.

The status related section 15*b* refers to the correlation by the system related section 15*a* and the storage unit 14, and correlates the business with conditions for determining respective status of the service process, the service procedure, the service support system, and the service function corresponding to the business.

Specifically, the status related section 15*b* associates elements of the determination criteria of the business status determination checklist 14*g*, the service process status determination checklist 14*h*, the service procedure status determination checklist 14*i*, the service support system status determination checklist 14*j*, and the service function status determination checklist 14*k* with each other.

Thus, the status related section 15*b* associates the conditions for determining the element statuses of the business, the service process, the service procedure, the service support system, and the service function with each other across the respective status determination checklists. For example, the service process status determination checklist 14*h* represents some details of the business status determination checklist 14*g*. Similarly, the service procedure status determination checklist 14*i* represents some details of the service process status determination checklist 14*h*. In addition, the service function status determination checklist 14*k* represents some details of the service procedure status determination checklist 14*i*. Further, the service support system status determination checklist 14*j* represents some details of the service function status determination checklist 14*k*.

Accordingly, the status related section 15*b* can specify conditions for determining element statuses of lists or flowcharts of the business, the service process, the service procedure, the service support system, and the service function. For example, the status related section 15*b* can specify status conditions of OS, middleware, and application software of the service support system 3001 for realizing the service function 4001, as a component of a group of conditions under which the service procedure 2001 is normally executed using the service function 4001.

Using the failure information of the service support system $N_S$, the system determination section 15*c* determines whether the service support system $N_S$ is functioning normally. Specifically, the system determination section 15*c* first acquires failure information of the service support system $N_S$ from the service support system $N_S$ or the abnormality detection system $N_A$ via the communication control unit 13.

For example, the system determination section 15*c* acquires failure information of the service support system $N_S$ when an error log occurs in the service support system $N_S$ or the detection system $N_A$ detects an abnormality of the service support system $N_S$ at the time of an incident occurrence. The system determination section 15c may periodically acquire failure information of the service support system $N_S$. Alternatively, the system determination section 15c may acquire failure information of the service support system $N_S$ manually input via the input unit 11 at the time of the incident occurrence.

Then, the system determination section 15c substitutes the processing result of the status related section 15b and the acquired failure information into a predetermined relational expression of the incident effect analysis expression 14a to determine whether the service support system $N_S$ functions normally. Then, for example, the system log of the service support system 3001 or the abnormality detection log of the abnormality detection system includes failure information indicating that a failure has occurred in the service support system 3001, the system determination section 15c determines that the service support system 3001 is in an abnormal status, that is, is not functioning normally.

Functions and coefficients of the functions of the predetermined relational expression used by the system determination section 15c are arbitrarily defined. Specifically, the functions and the coefficients may be defined to represent the logical structure of the conditions for determining using the processing result of the status related section 15b that the service support system $N_S$ is normal.

For example, when a monitoring target value exceeds a predetermined threshold value, the abnormality detection system determines to be abnormal and records it in the abnormality detection log. Therefore, even when an abnormality is detected according to the abnormality detection log of the abnormality detection system, a service function may be provided without any problem even when a maintenance work is required according to the system log of the service support system $N_S$. In this case, functions and coefficients may be defined to determine that "the service support system $N_S$ is normal, but the maintenance work is required". In addition to the determination of the normality/abnormality of the service support system $N_S$, functions and coefficients may be defined such that the processing performance value of the service support system $N_S$ can be added.

Using the failure information of the service support system $N_S$ and the status determination checklists, the service function determination section 15d determines whether the service function corresponding to the service support system $N_S$ is functioning normally.

Specifically, the service function determination section 15d substitutes the processing result of the status related section 15b, the determination result of the system determination section 15c and the failure information acquired by the system determination section 15c into a predetermined relational expression of the incident effect analysis expression 14a to determine whether the service function of the service support system $N_S$ is functioning normally.

Functions and coefficients of the functions of the predetermined relational expression used by the service function determination section 15d are arbitrarily defined. Specifically, the functions and the coefficients may be defined to represent the logical structure of the conditions for determining using the processing result of the status related section 15b that the service function of the service support system $N_S$ is normal.

For example, when the system determination section 15c determines that the service support system 3001 is abnormal, functions and coefficients may be defined such that the service function 4001 realized by the service support system 3001 reflects the logical structure of the service function status determination checklist 14k. In other words, when the service support system 3001 does not have a redundant configuration, since the service function 4001 is not realized when an abnormality occurs in the service support system 3001, the service function determination section 15d determines that the service function 4001 is abnormal.

On the other hand, a case is assumed in which the service support system 3001 and the service support system 3011 have a load distribution configuration and the service function 4001 is also realized by the service support system 3011. In such a case, the service function determination section 15d determines that "the service function 4001 is normal, but is lower than the normal processing performance" and the "the service support system 3001 needs to be restored" even when an abnormality occurs in the service support system 3001.

As described above, depending on the system configuration of the service support system, the conditions for realizing the service function 4001 change, and the conditions for determining the normality of the service function 4001, that is, the logical structure of the service function status determination checklist 14k change. Accordingly, functions and coefficients may be defined to reflect the logical structure of the service function status determination checklist 14k which differs depending on the system configuration of the service support system.

For example, it is considered that there is a correlation between the processing performance of the service function 4001 and the processing performance of the service support system 3001. Such a correlation is generally obtained by analysis of the system log of the service support system with machine learning or statistical analysis. Therefore, functions and coefficients may be defined to be capable of determining that "the service function 4001 is normal, but a status needs to be confirmed" when the service function 4001 is functioning but a deviation from the normal tendency is equal to or more than a predetermined value based on the analysis of the system log.

When it is determined that the service function is not functioning normally, the service activity determination section 15e uses the status determination checklists to determine whether the service procedure corresponding to the service function is normally executed. For example, using the service procedure status determination checklist 14i, the service activity determination section 15e determines whether the service procedure corresponding to the service function determined to be not functioning normally is normally executed. Similarly, using the service process status determination checklist 14h and the business status determination checklist 14g, the service activity determination section 15e determines whether the service process and the business corresponding to the service function determined to be not functioning normally are normally executed.

In addition, using an execution schedule of the service procedure, the service activity determination section 15e further determines whether the service procedure is normally executed. Using an execution frequency of the service procedure, the service activity determination section 15e further determines whether the service procedure is normally executed. Using the predetermined performance value included in the status determination checklist and the processing performance value of the service procedure, the service activity determination section 15e further determines whether the service procedure is normally executed.

In other words, the service activity determination section 15e multiplies the normality of the service function that implements the service activity to be determined, the performance of the service function, the presence or absence of availability of the service function, that is, the presence or absence of schedule of the service activity to be determined, and the degree of availability of the service function, that is, the scheduled amount of service activity to be determined to determine the normality of the service activity.

Specifically, the service activity determination section 15e first acquires the system log of the service support system N; and the service activity log of the service situation management system $N_t$ via the communication control unit 13.

For example, the service activity determination section 15e acquires the system log of the service support system $N_S$ and the service activity log of the service situation management system $N_t$ at the time of the incident occurrence. The service activity determination section 15e may periodically acquire the system log of the service support system $N_S$ and the service activity log of the service situation management system $N_t$. Alternatively, the service activity determination section 15e may acquire, at the time of the incident occurrence, the system log of the service support system $N_S$ and the service activity log of the service situation management system $N_t$ manually input via the input unit 11.

Then, the service activity determination section 15e substitutes the processing result of the status related section 15b, the determination result of the system determination section 15c and the service function determination section 15d, and the acquired service activity log into the predetermined relational expression of the incident effect analysis expression 14a to determine whether the service activity is normally executed.

For example, the service activity determination section 15e performs qualitative analysis to determine, based on the processing result of the status related section 15b and the processing results of the system determination section 15c and the service function determination section 15d, whether a certain service activity is disturbed by a location where an abnormality occurs.

For example, when the service function determination section 15d determines that the service function 4001 is abnormal, the service procedure 2001 using such a service function 4001 cannot be executed, so that the service activity determination section 15e determines that the service procedure 2001 is abnormal.

Alternatively, it is assumed that a service function 4111 is to automate all service procedure included in a service process 1111 and is the service process 1111 itself. When the service function determination section 15d determines that the service function 4111 is abnormal, the service process 1111 cannot be executed, so that the service activity determination section 15e determines that the service process 1111 is abnormal.

Alternatively, the service activity determination section 15e performs quantitative analysis to determine, based on the processing results of the system related section 15a and the status related section 15b, the determination results of the system determination section 15c and the service function determination section 15d, and the acquired service activity log, whether a certain service activity scheduled for any period of time is disturbed by a location where an abnormality occurs.

For example, when the service function determination section 15d determines that the service function 4001 is abnormal on the day when the service procedure 2001 using the service function 4001 is scheduled to be executed 100 times, if the service function 4001 is not restored within that day, the execution of the service procedure 2001 is disturbed. In such a case, the service activity determination section 15e determines that "100 executions of the service procedure 2001 may be disturbed".

Alternatively, it is assumed that the service function 4111 is to automate all the service procedures included in the service process 1111 to accept orders on an EC site and that sales of 100 million yen are realized on average for 1 million executions of the service process 1111. When the service function determination section 15d determines that the service function 4111 is abnormal on the day when the service process 1111 is expected to be executed 1.5 million times, if the service function 4111 is not restored within the same day, execution of the service process 1111 will be disturbed and sales are expected to decrease by 150 million yen. In such a case, the service activity determination section 15e determines that "sales are expected to decrease by 150 million yen".

Alternatively, it is assumed that the service function 4001 is realized by a configuration of a load distribution of the service support system 3001 and the service support system 3011. Further, it is proved that the service function 4001 can be normally executed up to 20 times per hour by analysis of the system log and the service activity log. When the service support system 3001 is abnormal, it is proved that the service function 4001 being executable when the service support system 3011 is normal is executed with the processing performance as much as half the normal case, that is, 100 times per hour. According to the service activity log, the system determination section 15c determines that the service support system 3001 is abnormal on the day when the service procedure 2001 using the service function 4001 is scheduled to be executed 100 times for 5 hours, the service activity determination section 15e determines that the service procedure 2001 is disturbed. At the same time, the service activity determination section 15e determines the degree of disturbance, such as "the processing performance is 10 times per hour and the execution can be made 50 times out of 100 times scheduled for 5 hours".

Analytical methods such as machine learning and statistical analysis of the service activity logs and system logs may be applied to trends and predictions of execution frequencies of the service activity in the determination of normality of the service activity of the service procedure 2001 and the service process 1111. In addition, trend and prediction values of execution frequencies calculated by other systems may be applied.

Further, the analysis device 10 executes either one or both of the qualitative analysis and the quantitative analysis selected by the user at the time of determining the normality of the service activity described above.

The functions and of the predetermined relational expression used by the service activity determination section 15e and the coefficients of the functions are arbitrarily defined. Specifically, the functions and the coefficients may be defined such that the logical structure of the condition, under which the service procedure is executed, are represented in terms of the processing result of the status related section 15b.

For example, when a failure occurs in the service function 4001 on a holiday when the execution of the service procedure 2001, which can be disturbed when a failure can occur in the service function 4001, is not scheduled, functions and coefficients may be defined such that the service activity determination section 15e determines that "the failure of the service function 4001 does not affect the service procedure 2001 on that day".

Then, the control unit 15 causes the output unit 12 to output, as a result of the analysis processing, the determination results of the system determination section 15c, the service function determination section 15d, and the service activity determination section 15e in a graph format. Specifically, the control unit 15 displays an abnormal location of the service support system based on the determination result of the system determination section 15c. In addition, the control unit 15 displays an abnormal location of the service function due to the abnormality of the service support system, based on the determination result of the service function determination section 15d. Further, the control unit 15 displays an abnormal location of the service activity due to the abnormality of the service support system and the service function, based on the determination result of the service activity determination section 15e.

Figure 8:
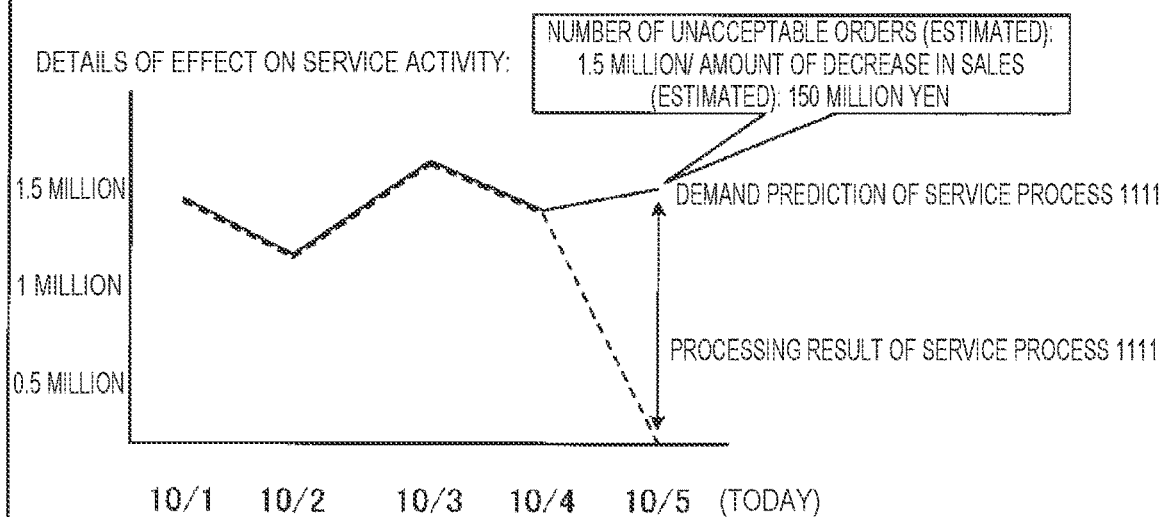
FIG. 8 is a diagram showing an example of screen display of an analysis result.

Here, FIG. 8 is a diagram showing an example of screen display of the analysis result. In the example shown in FIG. 8, a "service support system 3111-••program" is displayed as an alert location based on the determination result of the system determination section 15c. In addition, a "stop of the service function 4111 (0:00 occurrence, continuation of the failure)" is displayed as an IT system failure situation based on the determination result of the service function determination section 15d. Further, a "stop of business 0001-service process 1111 (stop of order acceptance on the EC site)" is displayed as an effect on the service activity based on the determination result of the service activity determination section 15e. As details of the effect on the service activity, the demand prediction and the processing result of the service process 1111, the estimated number of unacceptable orders, and the estimated amount of decrease in sales are displayed.

Thus, the user of the analysis device 10 can efficiently grasp the effect of the failure of the IT system on the service activity at the time of the incident occurrence. In other words, the analysis device 10 can use the error log included in the system log of the service support system and the abnormality detection log of the abnormality detection system as a starting point to appropriately arrange and present the causal relationship in which a certain service function of a certain service support system has an effect on a certain service activity.

In addition, the analysis device 10 can qualitatively or quantitatively analyze and present the effect of the service activity based on the service activity log. This makes it possible for the user to easily grasp how much the failure of a certain IT system has an effect on the service activity for any period of time. Accordingly, the user can accurately determine the necessity and importance of the maintenance work of the service support system based on, for example, whether the service activity is affected, and appropriately reflect countermeasures at the time of incident occurrence on the business continuity plan.

[Analysis Processing]

Figure 9:
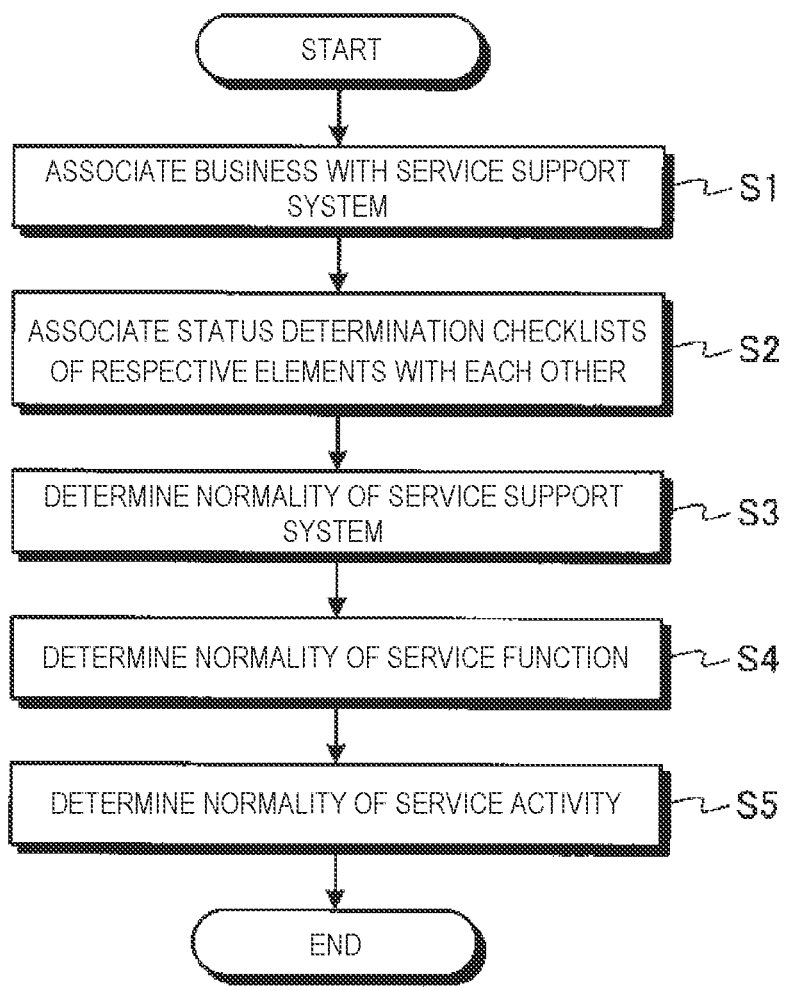
FIG. 9 is a flowchart showing an analysis processing procedure.

Next, the analysis processing of the analysis device 10 according to the present embodiment will be described with reference to FIG. 9. FIG. 9 is a flowchart showing an analysis processing procedure. In FIG. 9, the flowchart is started, for example, at the timing when the user inputs an operation to instruct the start.

First, the system related section 15a refers to the storage unit 14 and correlates the business with at least one of the service support system and the service function corresponding to the business. In other words, the system related section 15a associates the respective elements of the business, the service process, the service procedure, the service support system, and the service function with each other as shown in FIGS. 2 and 3 (step S1).

Further, the status related section 15b associates the status determination checklists of the respective elements with each other using the processing result of the system related section 15a (step S2).

Next, using the failure information of the service support system $N_S$, the system determination section 15c determines whether the service support system $N_S$ is functioning normally (step S3). Specifically, the system determination section 15c first acquires the failure information of the service support system N; from the service support system $N_S$ or the abnormality detection system $N_A$ via the communication control unit 13.

Next, using the processing result of the status related section 15b, the determination result of the system determination section 15c, and the failure information of the service support system $N_S$, the service function determination section 15d determines whether the service function of the service support system $N_S$ is functioning normally (step S4). Specifically, the service function determination section 15d substitutes the processing result of the status related section 15b, the determination result of the system determination section 15c, and the failure information acquired by the system determination section 15c into the predetermined relational expression of the incident effect analysis expression 14a to determine whether the service function of the service support system $N_S$ is functioning normally.

Then, the service activity determination section 15e determines normality of the service activity (step S5). For example, the service activity determination section 15e multiplies the normality of the service function that implements the service activity to be determined, the performance of the service function, the presence or absence of availability of the service function, that is, the presence or absence of schedule of the service activity to be determined, and the degree of availability of the service function, that is, the scheduled amount of service activity to be determined to determine the normality of the service activity. Thus, a series of analysis processing is completed.

The respective steps described above may be executed continuously at the time of the incident occurrence, or may be executed separately at different time zones. For example, steps S1 and S2 may be executed at arbitrary timings in ordinal times, and steps S3 to S5 may be executed at the time of the incident occurrence. In such cases, the analysis device 10 may store the results of steps S1 and S2 in the storage unit 14, and read the results from the storage unit 14 at the time of execution of steps S3 to S5.

The above-described analysis processing of the analysis device 10 may be executed for examining countermeasures at the time of the incident occurrence, or may be executed for formulating or modifying a business continuity plan.

In the analysis device 10 according to the present embodiment, as described above, the storage unit 14 stores the service procedure constituting the business, the service support system used in the service procedure, and the service function constituting the service support system in association with each other, and stores the status determination checklists in which a plurality of conditions for determining whether the service procedure, the service support system, and the service function are normal are represented by the logical combination. In addition, using the failure information of the service support system and the status determination checklists, the service function determination section 15d determines whether the service function corresponding to the service support system is functioning normally. In addition, when it is determined that the service function is not functioning normally, the service activity determination section 15e uses the status determination checklists to determine whether the service procedure corresponding to the service function is normally executed.

For example, using the execution schedule of the service procedure, the service activity determination section 15e further determines whether the service procedure is normally executed. Alternatively, using the execution frequency of the service procedure, the service activity determination section 15e further determines whether the service procedure is normally executed. Alternatively, using the predetermined performance value included in the status determination checklists and the processing performance value of the service procedure, the service activity determination section 15e further determines whether the service procedure is normally executed.

Thus, the analysis device 10 can use the error log included in the system log of the service support system and the abnormality detection log of the abnormality detection system as a starting point to appropriately arrange and present the causal relationship in which a certain service function of a certain service support system has an effect on a certain service activity. In addition, the analysis device 10 can qualitatively or quantitatively analyze and present the effect on the service activity based on the service activity log. This makes it possible for the user to easily grasp how much the failure of a certain IT system has an effect on the service activity for any period of time.

Accordingly, the user can efficiently grasp the effect of the failure of the IT system on the service activity at the time of incident occurrence. For example, the user can accurately determine the necessity and importance of maintenance work of the service support system based on, for example, whether the service activity is affected, and appropriately reflect countermeasures at the time of incident occurrence on the business continuity plan. As described above, according to the analysis device 10 of the present embodiment, it is possible to accurately grasp the situation of damage caused by the incident and appropriately select countermeasures at the time of incident occurrence.

Second Embodiment

An analysis device 10 of the present embodiment predicts various effects during any kind of incident occurrence, for example, during ordinary times or during an incident occurrence. The analysis device 10 of the present embodiment differs from that of the first embodiment described above in that a failure event serving as an effect prediction target is received and the effect of the failure event is predicted by the same processing as the determination of the normality of the service activity of the first embodiment. Other processes similar to those of the first embodiment will not be described.

Specifically, the service activity determination section 15e further predicts an effect on the service activity of the input failure event related to the service support system or the service procedure.

Figure 10:
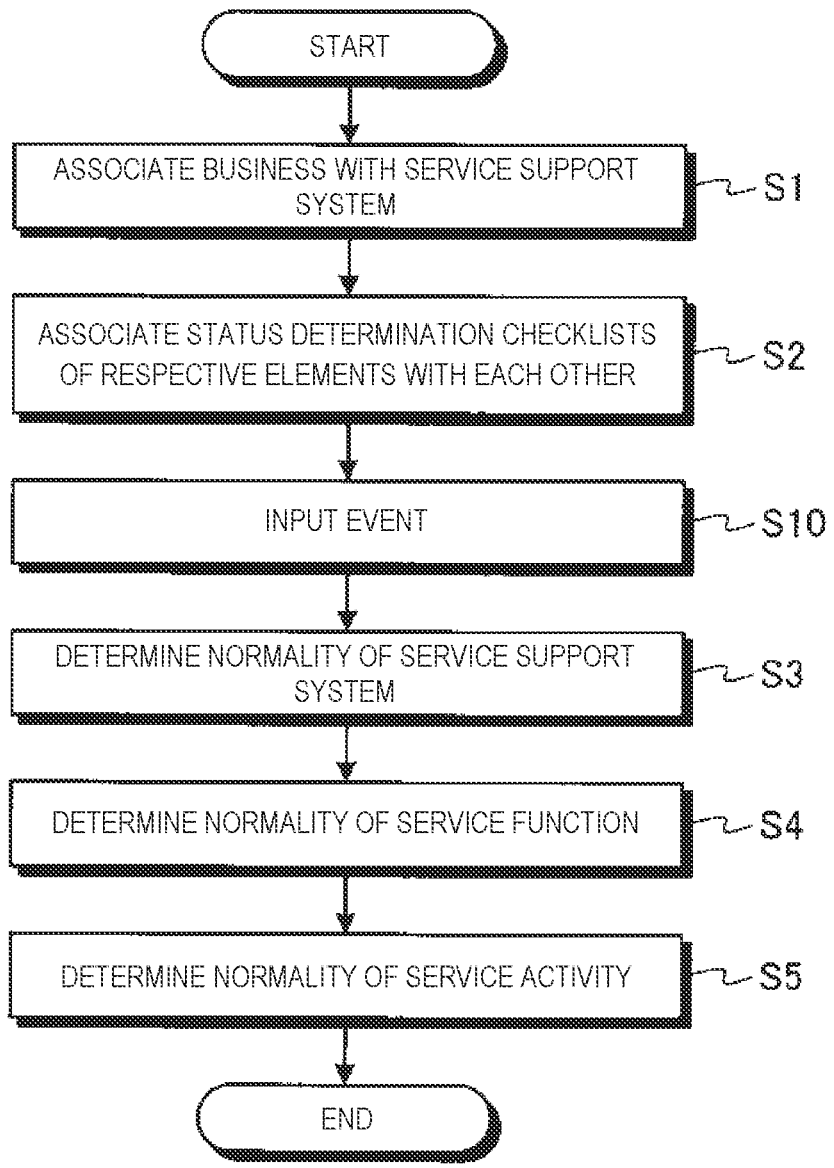
FIG. 10 is a flowchart showing an analysis processing procedure of a second embodiment.

Here, FIG. 10 is a flowchart showing an analysis processing procedure of the second embodiment. The flowchart of FIG. 10 differs from the flowchart shown in FIG. 9 in that a process of step S10 is executed after the process of step S2.

In the process of step S10, the control unit 15 receives the input of the failure event serving as an effect prediction target. For example, the control unit 15 acquires a failure event manually via the input unit 11 or acquires the failure event via the communication control unit 13 during ordinary times or during an incident occurrence.

The types of failure events are classified into service activities including the business, the business process, and the service procedure and service support systems including the service support system and the service function. The user selects an arbitrary classification and inputs a failure event belonging to each classification. For example, the user inputs a "service function 4001" in an input field of a selection type- or a manual input type-failure event. In such a case, the system determination section 15c performs a process of predicting the effect when a failure occurs in the service function 4001.

In other words, when the input failure event classification is the service support system, the control unit 15 causes a process to proceed to step S3. Since subsequent processes are the same as those in FIG. 9, the description thereof will not be presented.

When the input failure event classification is the service activity, since it is assumed that the effect of the failure event is predicted at the time of formulation of the business continuity plan, the control unit 15 causes a process to proceed to step S5.

Figure 11:
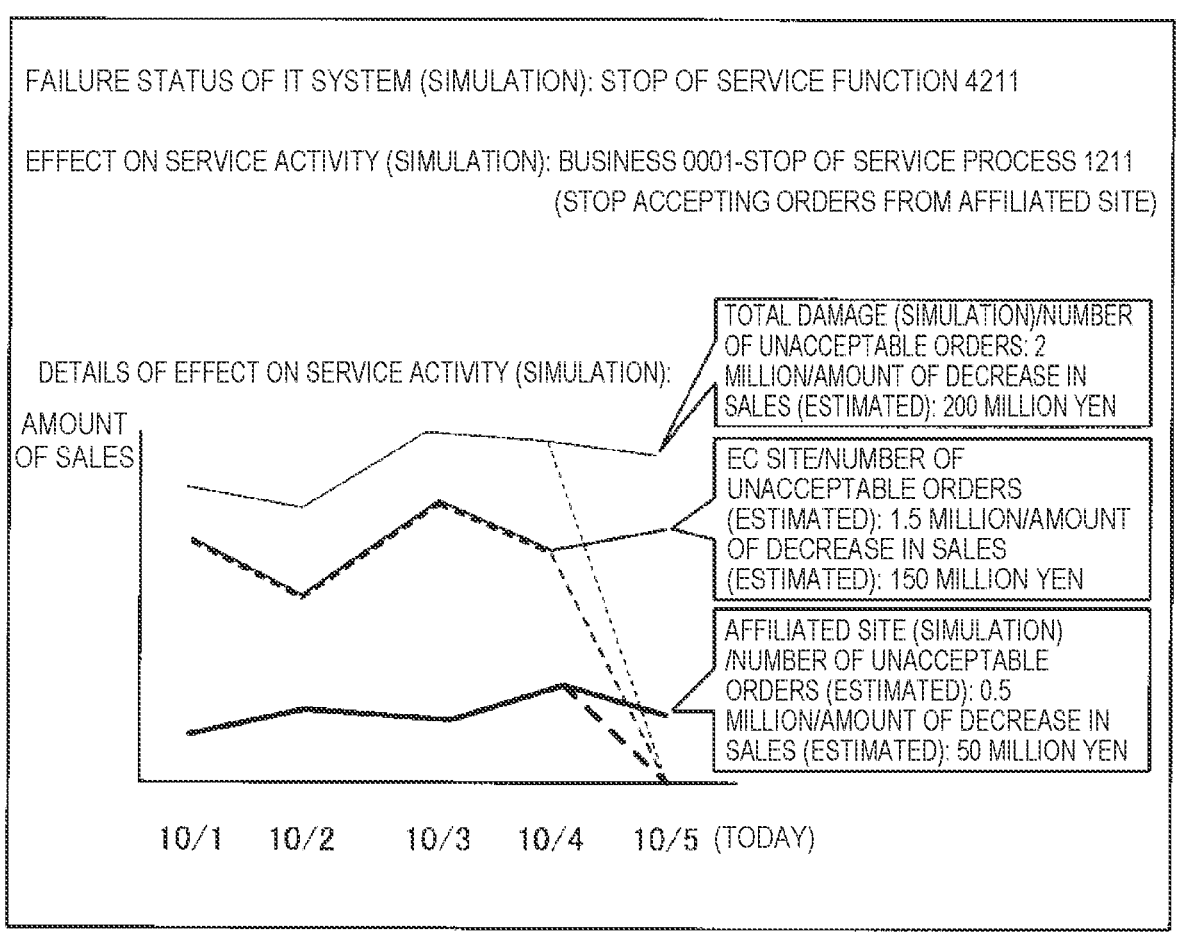
FIG. 11 is a diagram showing an example of screen display of a determination result of the second embodiment.

Further, FIG. 11 is a diagram showing a screen display example of analysis results of the second embodiment. FIG. 11 illustrates a case where an effect of a failure event "stop of a service function 4211" is simulated in a situation where sales are already affected by the stop of the service function 4111. In such a case, in the example shown in FIG. 11, a "stop of a business 0001-service process 1211 (a stop of order acceptance from an affiliated site)" is displayed as an effect on the service activity according to the determination result of the service activity determination section 15e. Further, as details of the effect on the service activity, the estimated number of unacceptable orders and the estimated amount of decrease in sales are displayed for each of an EC site and the affiliated site. In addition, such a sum is displayed as a total damage.

Thus, the user of the analysis device 10 can effectively grasp the effect of a certain event on the service activity during ordinary times or during an incident occurrence. In other words, when the user assumes information generated in each location of the service activity or the service support system and inputs an event for which the effect is to be predicted, the analysis device 10 can appropriately arrange and present the causal relationship in which a certain service function of a certain service support system has an effect on a certain service activity. Accordingly, the user can easily grasp how much the event for which the effect is to be predicted has an effect on the service activity and the service support system.

In addition, the analysis device 10 can qualitatively or quantitatively analyze and present the effect on the service activity based on the service activity log. Thus, the user can easily grasp how much the event for which the effect is to be predicted has an effect on the service activity for any period of time.

When the process of the present embodiment is executed after the process of the first embodiment described above is executed, the analysis device 10 assumes that an additional incident occurs during the occurrence of a certain incident, and can predict and present the effect of the incident which additionally occurs. Therefore, the user can effectively grasp the effect of the incident which additionally occurs.

The respective steps shown in FIG. 10 may be executed continuously at the time of the incident occurrence, or may be executed separately at different time zones. For example, steps S1 and S2 may be executed at arbitrary timings in ordinal times, and steps S10 and S3 to S5 may be executed at the time of the incident occurrence. In such cases, the analysis device 10 may store the results of steps S1 and S2 in the storage unit 14, and read the results from the storage unit 14 at the time of execution of steps S10 and S3 to S5.

Third Embodiment

An analysis device 10 of the present embodiment predicts an effect when an arbitrary handling work is performed in ordinary times or during an incident occurrence. The analysis device 10 of the present embodiment differs from that of the first embodiment described above in that an input of handling work serving as an effect prediction target is received and the effect of performing the handling work is predicted by the same processing as the determination of the normality of the service activity of the first embodiment described above. Other processes similar to those of the first embodiment will not be described.

Specifically, the service activity determination section 15e further predicts an effect on the service activity of the input handling work related to the service support system or the service procedure.

Figure 12:
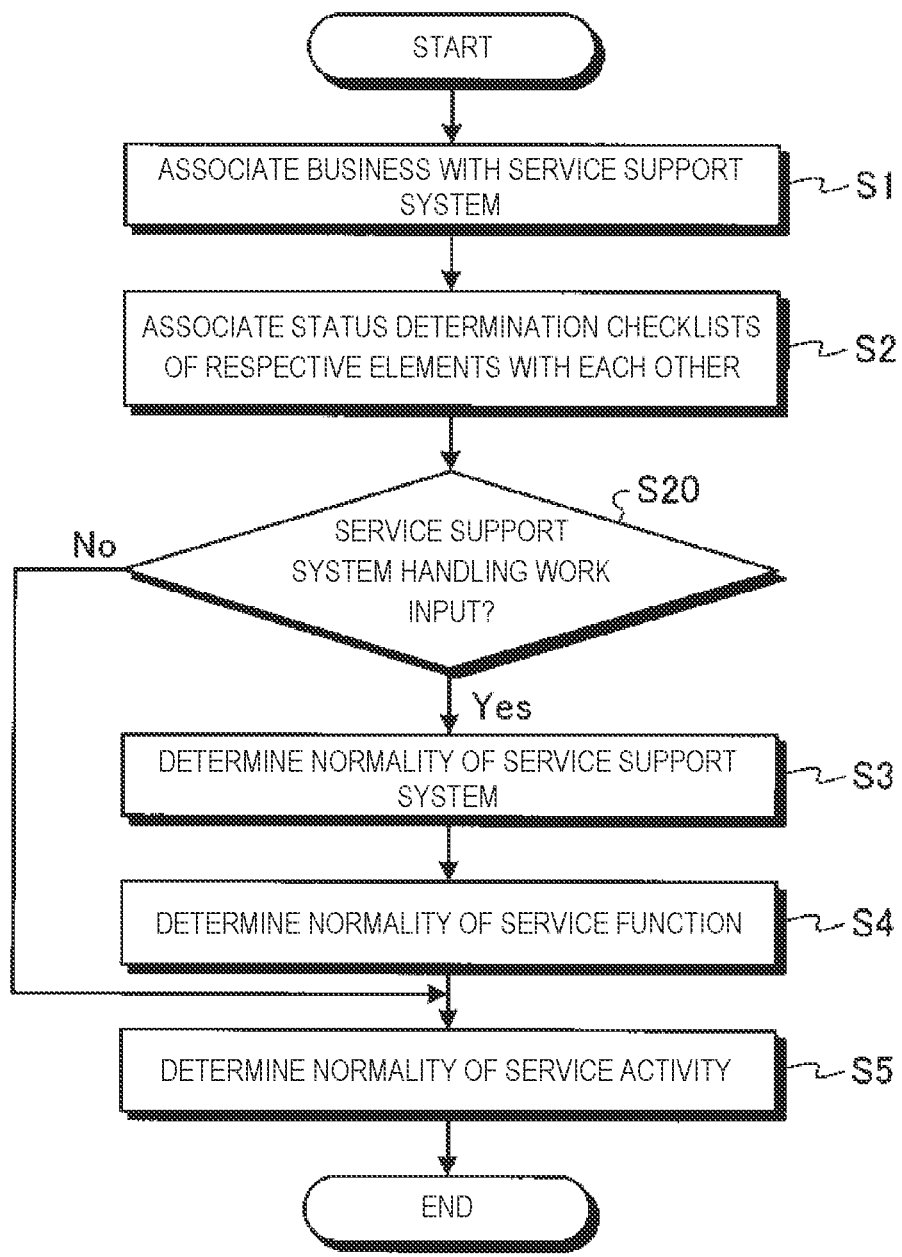
FIG. 12 is a flowchart showing an analysis processing procedure of a third embodiment.

Here, FIG. 12 is a flowchart showing an analysis processing procedure of the third embodiment. The flowchart of FIG. 12 differs from the flowchart shown in FIG. 9 in that a process of step S20 is executed after the process of step S2.

In the process of step S20, the control unit 15 receives the input of the handling work serving as an effect prediction target. For example, the control unit 15 acquires the handling work manually via the input unit 11 or acquires the handling work via the communication control unit 13 during ordinary times or during an incident occurrence.

Here, the handling work is classified into a service support system handling work, a service support system handling accompanying work, or a service substituting work. The service support system handling work is handling work for restoring the service support system. The service support system handling accompanying work is handling work that occurs accompanied by the service support system handling work. The service substituting work is handling work for continuing a service when a failure occurs in the service support system.

The user selects an arbitrary classification and inputs handling work belonging to each classification. For example, the user inputs "restore a service support system 3001" in an input field of selection type- or a manual input type-handling work. In such a case, the system determination section 15c performs a process of predicting the effect when a failure occurs when the service support system 3001 is restored.

In other words, when the input handling work classification is the service support system handling work (step S20, Yes), the control unit 15 causes a process to proceed to step S3. Since processes of steps S3 and step S4 are the same as those in FIG. 9, the description thereof will not be presented.

In the process of step S5, the service activity determination section 15e determines normality of the service activity as an effect of the handling work.

Here, a case will be described where handling work for which the effect is to be predicted is the service support system handling work. For example, when a failure occurs in the service function 4001, a case is assumed that a service procedure 2101, a service procedure 2102, a service procedure 2103, and a service procedure 2104 are executed as a series of maintenance work for restoring the service function 4001. When the service function 4001 is restored by execution of the service procedure, the service procedure 2001 using the service function 4001 can be executed. In such a case, the service activity determination section 15e determines by qualitative analysis that "the service procedure 2001 can be executed".

The service activity determination section 15e may determine, by quantitative analysis based on the tendency and prediction of the execution frequency of the service activity, that "when the service function 4001 is restored, the service procedure 2001 can be executed 100 times".

In the process of step S20, when the input handling work classification is not the service support system handling work (step S20, No), that is, when the input handling work is the service support system handling accompanying work or the service substituting work, the control unit 15 causes the process to proceed to step S5.

Then, when the handling work for which the effect is to be predicted is the service support system handling accompanying work, the service activity determination section 15e determines whether the input service support system handling accompanying work supports a certain service activity of the service activities. Functions and coefficients of the functions of a predetermined relational expression used by the service activity determination section 15e are defined to indicate the degree to which a certain service support system handling accompanying work has an effect on a certain service activity by machine learning and statistical analysis of the service activity log and the system log.

For example, a case is assumed that a failure occurs in the service function 4111 that automates all the service procedures included in the service process 1111 to accept orders on an EC site. In such a case, according to the service activity log for dealing with the past incident, it is assumed that the number of inquiries from end users who cannot give orders on the EC site has increased rapidly to 1000 per hour. In addition, it is assumed to find the effect of reducing inquiries from end users by 50% due to the handling work of "publishing a failure event on the EC site" from the service activity log corresponding to the past incident. Therefore, the service activity determination section 15e determines that the effect of the service support system handling accompanying work of "publishing the failure event on the EC site" is "the number of inquiries is reduced to 500 per hour".

Analytical methods such as machine learning and statistical analysis of the service activity log and system log may be applied to the value of the effect of the service support system handling accompanying work. Further, the value of the effect of the service support system handling accompanying work calculated by other systems may be applied.

When the handling work for which the effect is to be predicted is the service substituting work, the service activity determination section 15e determines whether the input service substituting work realizes a certain service activity of the service activities. Functions and coefficients of the functions of a predetermined relational expression used by the service activity determination section 15e are defined to indicate the degree to which a certain service substituting work has an effect on a certain service activity by machine learning and statistical analysis of the service activity log and the system log.

For example, when a failure occurs in the service function 4001 and the service procedure 2001 using the service function 4001 is disturbed, if the service substituting work is executed instead of the service function 4001, it is assumed that 50 services can be executed per hour compared with the service process using the service function 4001. In such a case, the service activity determination section 15e determines that the effect of the service substituting work of "executing the service substituting work of the service function 4001" is "restored to the situation where the service procedure 2001 can be executed 50 times per hour".

The functions of the predetermined relational expression used by the service activity determination section 15e and the coefficients of the functions are arbitrarily defined. Specifically, the functions and the coefficients may be defined such that the logical structure of the condition, under which the work procedure is executed, are represented in terms of the processing result of the status related section 15b.

For example, there is a time required from the start to the completion of the handling work of restoring the service function 4001, and the restoring effect appears only when the service function 4001 is used after the handling work is completed. When the service substituting work is executed until the service function 4001 is restored, the service procedure 2001 is provisionally restored and executed with restrictions by execution of the service substituting work, and the service procedure 2001 is completely restored and executed by the completion of the handling work of restoring the service function 4001. In such a case, functions and coefficients may be defined such that the service activity determination section 15e can express execution validity/invalidity of the service procedure 2001 and its time-series change as an effect of the execution and progress of these various types of handling work.

Figure 13:
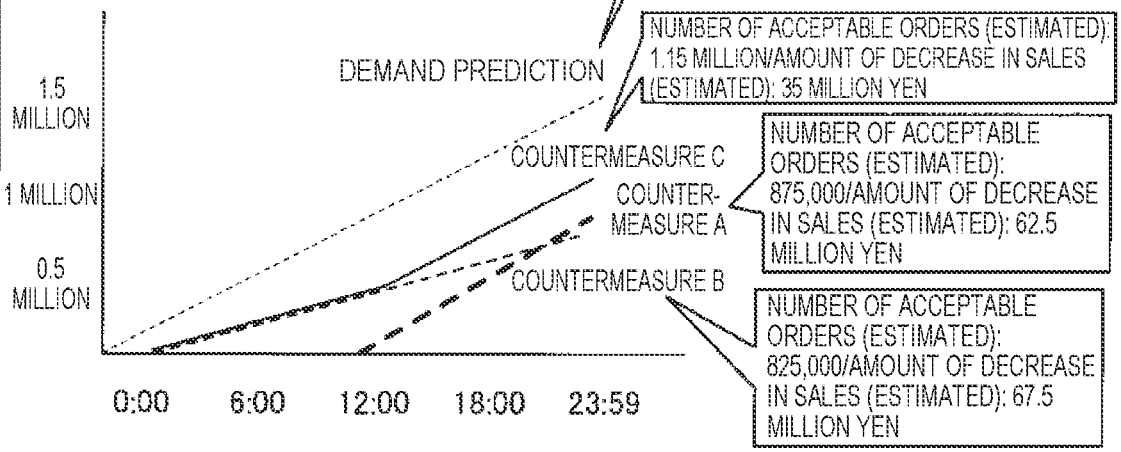
FIG. 13 is a diagram showing an example of screen display of a determination result of the third embodiment.

FIG. 13 is a diagram showing a screen display example of analysis results of the third embodiment. In FIG. 13, as the handling work, simulation results of a plurality of countermeasures at the time of incident occurrence are comparatively displayed. In the example shown in FIG. 13, the required time, the work cost, and the required number of personnel are displayed for each of three countermeasures A to C. In addition, the effect of each of the countermeasures is displayed. As details of the effect on the work activity "business 0001-restoration of service process 1111 (resumption of order acceptance on the EC site), the effect of each countermeasure (the estimated number of acceptable orders and the estimated amount of sales) is displayed.

Thus, the user of the analysis device 10 can effectively grasp the effect of a certain handling work on the service activity during ordinary times or during an incident occurrence. In other words, when the user inputs the handling work for which the effect is to be predicted, the analysis device 10 can appropriately arrange and present the causal relationship in which a certain service function of a certain service support system has an effect on a certain service activity. Accordingly, the user can easily grasp how much the handling work for which the effect is to be predicted has an effect on the service activity and the service support system.

In addition, when a plurality of countermeasures are being considered, the plurality of countermeasures and effects thereof are arranged and presented to the user in a list format, and thus the user can compare and determine which of the plurality of countermeasures is more appropriate.

In addition, the analysis device 10 can qualitatively or quantitatively analyze and present the effect on the service activity based on the service activity log. Thus, the user can easily grasp how much the handling work has an effect on the service activity for any period of time. Thus, the user can easily grasp how much the handling work has an effect on the service activity for any period of time. In addition, the user can easily understand the effect when a plurality types of work are combined. In this way, since the effect of the handling work can be simulated in advance, the user can select an effective countermeasures and appropriately reflect it on the business continuity plan.

When the process of the present embodiment is executed after the process of the first embodiment or the process of the second embodiment is executed, the analysis device 10 can predict the effect when a certain incident occurs. Accordingly, the user can simulate the effect of the incident, select an effective countermeasure at the time of incident occurrence, and appropriately reflect it on the business continuity plan.

The respective steps shown in FIG. 12 may be executed continuously at the time of the incident occurrence, or may be executed separately at different time zones. For example, steps S1 and S2 may be executed at arbitrary timings in ordinal times, and steps S20 and S3 to S5 may be executed at the time of the incident occurrence. In such cases, the analysis device 10 may store the results of steps S1 and S2 in the storage unit 14, and read the results from the storage unit 14 at the time of execution of steps S20 and S3 to S5.

[Program]

It is also possible to create a computer program written in a computer executable language, for the process executed by the analysis device 10 described in the embodiment. In one embodiment, the analysis device 10 can be implemented by installing an analysis program that executes the above-described analysis processing as package software or online software on a desired computer. For example, the analysis program is executed by an information processing device, and thus the information processing device can function as the analysis device 10. The information processing device described in the description includes a desktop type or notebook type personal computer. In addition, the information processing device includes smartphones, mobile communication terminals such as mobile phones and PHS (Personal Handyphone System), and slate terminals such as PDA (Personal Digital Assistant). Further, the function of the analysis device 10 may be implemented in a cloud server.

Figure 14:
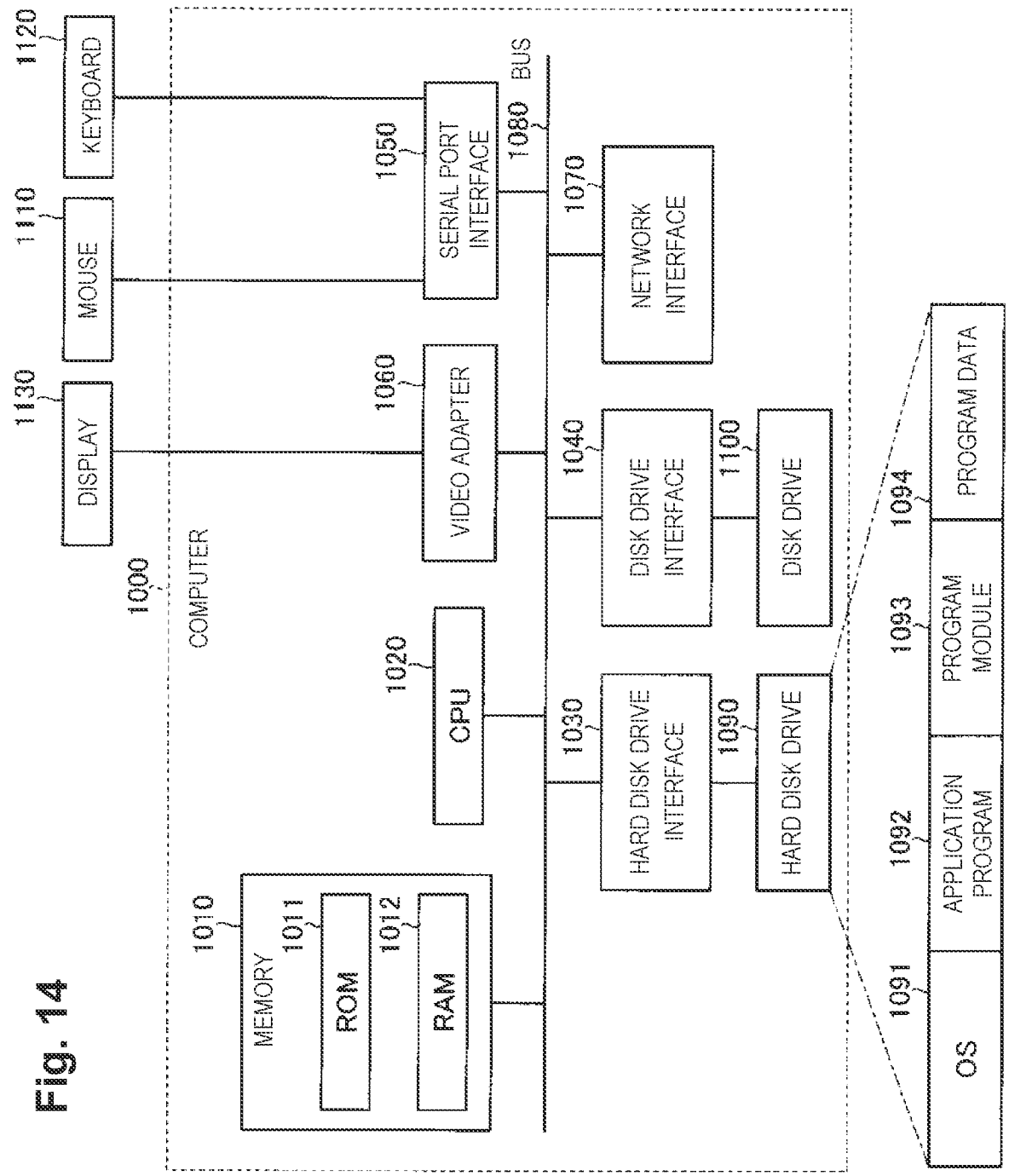
FIG. 14 is a diagram showing an example of a computer that executes an analysis program.

FIG. 14 is a diagram showing a computer that executes an analysis program. The computer 1000 includes, for example, a memory 1010, a CPU 1020, a hard disk drive interface 1030, a disk drive interface 1040, a serial port interface 1050, a video adapter 1060, and a network interface 1070. The respective components are connected to each other via a bus 1080.

The memory 1010 includes a read only memory (ROM) 1011 and a RAM 1012. The ROM 1011 stores therein, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disc and an optical disc is inserted into the disk drive 1100. The serial port interface 1050 is connected to a mouse 1110 and a keyboard 1120, for example. The video adapter 1060 is connected to a display 1130, for example.

In this example, the hard disk drive 1090 stores therein an OS 1091, an application program 1092, a program module 1093, and program data 1094, for example. Each types of information described above embodiment is stored, for example, in the hard disk drive 1090 or a memory 1010.

In addition, the analysis program is stored in the hard disk drive 1090 as, for example, a program module 1093 in which instructions executed by the computer 1000 are described.

Specifically, the program module 1093 in which each process executed by the analysis device 10 described in the above embodiments is stored in the hard disk drive 1090.

Data used for information processing by the analysis program is stored as program data 1094 in the hard disk drive 1090, for example. Then, the CPU 1020 reads the program module 1093 and the program data 1094 stored in the hard disk drive 1090 into the RAM 1012 as needed, and executes each of the procedures described above.

The program module 1093 and the program data 1094 related to the analysis program may be stored in a for example, a removable storage medium and read out by the CPU 1020 via the disk drive 1100 without being limited to the case of being stored in the hard disk drive 1090. Alternatively, the program module 1093 and the program data 1094 related to the analysis program may be stored in another computer connected via a network such as LAN or WAN (Wide Area Network), and read out by the CPU 1020 via the network interface 1070.

The embodiment to which the invention devised by the present inventor is applied has been described above. Nevertheless, the present invention is not limited by the description and the drawings that constitute part of the disclosure of the present invention according to the present embodiment. In other words, other embodiments, examples, operational technologies, and the like that are conceived based on the present embodiment by those skilled in the art are all included in the scope of the present invention.

REFERENCE SIGNS LIST

10 Analysis device
11 Input unit
12 Output unit
13 Communication control unit
14 Storage unit
14a Incident effect analysis expression
14b Business list
14c Service process list
14d Service flowchart
14e Service support system list
14f Service support system flowchart
14g Business status determination checklist
14h Service process status determination checklist
14i Service procedure status determination checklist
14j Service support system status determination checklist
14k Service function status determination checklist
15 Control unit
15a System related section
15b Status related section
15c System determination section
15d Service function determination section
15e Service activity determination section

The invention claimed is:

1. An analysis device comprising a processor configured to execute a method comprising:
   storing a procedure constituting a task, a support system used in the procedure, and a function including the support system in association with each other;
   storing a status determination checklist in which a plurality of conditions for determining whether the procedure, the support system, and the function are normal are represented by a logical combination;
   determining whether a function corresponding to the support system is functioning normally, by using failure information of the support system and the status determination checklist; and
   when it is determined that the function is not functioning normally, determining whether the procedure associated with the function is normally executed, by using the status determination checklist, a predetermined performance value, and a processing performance value of the procedure.

2. The analysis device according to claim 1, wherein the determining that the function is not functioning normally further determines whether the procedure is normally executed, by using an execution schedule of the procedure.

3. The analysis device according to claim 1, wherein the determining that the function is not functioning normally further determines whether the procedure is normally executed, by using an execution frequency of the procedure.

4. The analysis device according to claim 1, wherein the status determination checklist includes a condition represented in terms of the predetermined performance value.

5. The analysis device according to claim 1, wherein the determining that the function is not functioning normally further predicts an effect of a failure event related to an input support system or service procedure on an activity.

6. The analysis device according to claim 1, wherein the determining that the function is not functioning normally further predicts an effect of a handling work related to an input support system or procedure on an activity.

7. A computer-implemented method for analysis, the method comprising:
   storing a procedure constituting a task, a support system used in the procedure, and a function constituting the support system in association with each other;
   storing a status determination checklist in which a plurality of conditions for determining whether the procedure, the support system, and the function are normal are represented by a logical combination;
   determining whether a function corresponding to the support system is functioning normally, by using failure information of the support system and the status determination checklist; and
   determining when it is determined that the function is not functioning normally, whether the procedure associated with the function is normally executed, using the status determination checklist, a predetermined performance value, and a processing performance value of the procedure.

8. A computer-readable non-transitory recording medium storing computer-executable program instruction that when executed by a processor cause a computer system to:
   determine, using a store stores a procedure constituting a task, a support system used in the procedure, and a function constituting the support system in association with each other;
   store a status determination checklist in which a plurality of conditions for determining whether the procedure, the support system, and the function are normal are represented by a logical combination and determining whether a function corresponding to the support system is functioning normally, by using failure information of the support system and the status determination checklist; and
   when it is determined that the function is not functioning normally, determine whether the procedure associated with the function is normally executed, using the status determination checklist, a predetermined performance value, and a processing performance value of the procedure.

9. The computer-implemented method according to claim 7, wherein the determining whether the procedure associated with the function is normally executed further determines whether the procedure is normally executed, by using an execution schedule of the procedure.

10. The computer-implemented method according to claim 7, wherein the determining whether the procedure associated with the function is normally executed further determines whether the procedure is normally executed, by using an execution frequency of the procedure.

11. The computer-implemented method according to claim 7, wherein the status determination checklist includes a condition represented in terms of the predetermined performance value.

12. The computer-implemented method according to claim 7, wherein the determining whether the procedure associated with the function is normally executed further predicts an effect of a failure event related to an input support system or procedure on an activity.

13. The computer-implemented method according to claim 7, wherein the determining whether the procedure associated with the function is normally executed further predicts an effect of a handling work related to an input support system or procedure on an activity.

14. The computer-readable non-transitory recording medium of claim 8, wherein the determining whether the procedure associated with the function is normally executed further determines whether the procedure is normally executed, by using an execution schedule of the procedure.

15. The computer-readable non-transitory recording medium of claim 8, wherein the determining whether the procedure associated with the function is normally executed further determines whether the procedure is normally executed, by using an execution frequency of the procedure.

16. The computer-readable non-transitory recording medium of claim 8, wherein the status determination checklist includes a condition represented in terms of the predetermined performance value.

17. The computer-readable non-transitory recording medium of claim 8, wherein the determining whether the procedure associated with the function is normally executed further predicts an effect of a failure event related to an input support system or procedure on an activity.

18. The computer-readable non-transitory recording medium of claim 8, wherein the determining whether the procedure associated with the function is normally executed further predicts an effect of a handling work related to an input support system or procedure on an activity.

* * * * *